United States Patent
Kielb et al.

(10) Patent No.: US 9,305,668 B2
(45) Date of Patent: Apr. 5, 2016

(54) PRESSURIZED WATER REACTOR FLOW SKIRT APPARATUS

(75) Inventors: John F. Kielb, Westfield, MA (US); Richard E. Schwirian, Pittsburgh, PA (US); Naugab E. Lee, Simsbury, CT (US); David R. Forsyth, Cheswick, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 2555 days.

(21) Appl. No.: 12/027,341

(22) Filed: Feb. 7, 2008

(65) Prior Publication Data

US 2015/0310943 A1    Oct. 29, 2015

Related U.S. Application Data

(60) Provisional application No. 60/889,312, filed on Feb. 12, 2007.

(51) Int. Cl.
*G21C 15/243* (2006.01)

(52) U.S. Cl.
CPC .................... *G21C 15/243* (2013.01)

(58) Field of Classification Search
USPC ............................ 376/352, 399, 365, 393, 395
See application file for complete search history.

(56) References Cited

U.S. PATENT DOCUMENTS

| | | | |
|---|---|---|---|
| 3,548,222 A | | 12/1970 | Hobson |
| 4,557,891 A | * | 12/1985 | Gibbons et al. ............... 376/397 |
| 4,649,609 A | | 3/1987 | Allison et al. |
| 4,759,904 A | | 7/1988 | Gillett et al. |
| 5,267,285 A | | 11/1993 | Ekeroth et al. |
| 5,436,945 A | * | 7/1995 | Weisel et al. ................. 376/287 |
| 5,617,457 A | * | 4/1997 | Ren et al. ...................... 376/352 |
| 2007/0133732 A1 | | 6/2007 | Nakayama et al. |

OTHER PUBLICATIONS

Byung-Jin Lee et al., "A Review on the Regionalization Methodology for Core Inlet Flow Distribution Map", Journal of the Korean Nuclear Society, vol. 33, No. 4, pp. 441-456, Aug. 2011.

* cited by examiner

*Primary Examiner* — Jack W Keith
*Assistant Examiner* — Sean P Burke
(74) *Attorney, Agent, or Firm* — Richard J. Coldren; Westinghouse Electric Company LLC

(57) ABSTRACT

A pressurized water reactor vessel having a flow skirt formed from a perforated cylinder structure supported in the lower reactor vessel head at the outlet of the downcomer annulus, that channels the coolant flow through flow holes in the wall of the cylinder structure. The flow skirt is supported at a plurality of circumferentially spaced locations on the lower reactor vessel head that are not equally spaced or vertically aligned with the core barrel attachment points, and the flow skirt employs a unique arrangement of hole patterns that assure a substantially balanced pressure and flow of the coolant over the entire underside of the lower core support plate.

22 Claims, 5 Drawing Sheets

PRESSURIZED WATER REACTOR FLOW SKIRT APPARATUS

CROSS-REFERENCE TO RELATED APPLICATIONS

This invention claims priority from Provisional Application Ser. No. 60/889,312, filed Feb. 12, 2007.

GOVERNMENT INTEREST

This invention was made with government support under Contract No. DE-FC07-051D14636 awarded by the Department of Energy. The government has certain rights in this invention.

BACKGROUND OF THE INVENTION

1. Field of the Invention

This invention relates to water-cooled nuclear reactors and more particularly to apparatus for improving the distribution of coolant entering the core of water-cooled nuclear reactors.

2. Description of the Prior Art

The primary side of nuclear reactor power generating systems which are cooled with water under pressure comprises a closed circuit which is isolated from and in heat exchange relationship with a secondary side for the production of useful energy. The primary side comprises the reactor vessel enclosing a core internals structure that supports a plurality of fuel assemblies containing fissile material, the primary circuit within heat exchange steam generators, the inner volume of a pressurizer, pumps and pipes for circulating pressurized water; the pipes connecting each of the steam generators and pumps to the reactor vessel independently. Each of the parts of the primary side comprising a steam generator, a pump and a system of pipes which are connected to the vessel form a loop of the primary side. The primary side is also connected to auxiliary circuits, including a circuit for volumetric and chemical monitoring of the pressurized water. The auxiliary circuit, which is arranged branching from the primary circuit, makes it possible to maintain the quantity of water in the primary circuit by replenishing, when required, with measured quantities of water, and to monitor the chemical properties of the coolant water, particularly its content of boric acid, which is important to the operation of the reactor.

The average temperature of the core components during full power reactor operation is approximately 580° F. (304° C.). Periodically, it is necessary to shut down the reactor system for maintenance and to gain access to the interior side of the pressure vessel. During such an outage, the internal components of the pressure vessel can cool to a temperature of approximately 50° F. (10° C.). The internal components of a pressure vessel typically consist of upper and lower internals. The upper internals include a control rod guide tube assembly, support columns, conduits for instrumentation which enter the reactor through the closure head, and a fuel assembly alignment structure, referred to as the upper core plate. The lower internals include a core support structure referred to as the core barrel, a core shroud that sits inside the core barrel and converts the circular interior of the barrel to a stepped pattern that substantially corresponds to the perimeter profile of the fuel assemblies that constitute the core supported between the lower core support plate and the upper core support plate.

Generally, the reactor vessel is cylindrical having a hemispherical lower end. The core barrel is connected to the interior walls of the reactor vessel at or adjacent to the area where the cylindrical and hemispherical portions of the reactor vessel meet. Below the main core support, i.e. the core barrel that is capped at its lower end with the lower core support, the hemispherical vessel defines a lower head or lower plenum. A generally annular downcomer surrounds the reactor core barrel and an inner wall of the reactor vessel. Cooling fluid, typically water, is pumped into this annular downcomer. The coolant fluid circulates downward into the lower plenum. The hemispherical shape of the lower plenum assists in evenly circulating the coolant fluid therein. A plurality of reactor core coolant inlet openings are located on the underside of the lower core support plate. Coolant flows from the lower plenum, into the core coolant inlet openings and upwardly into the core to cool the fuel assemblies.

In order to maintain adequate and uniform cooling throughout the core, it is important that a uniform coolant flow and pressure be maintained across all of the reactor core coolant inlet openings in the lower core support plate. Non-uniform coolant pressure or flow causes uneven coolant flow into the core, which results in uneven cooling of the fuel assemblies of the core. Uneven fuel assembly cooling may force the entire core to be derated to accommodate "hot assembly" locations. Non-uniform coolant flow and pressure may result in vortices or other flow disruptions to form in the coolant fluid circulating in the lower plenum.

It is desirable to provide core monitoring instrumentation within the core of a nuclear reactor. Traditionally, the leads connecting such instrumentation to the exterior of the reactor exit the reactor vessel through a central portion of the lower hemispherical portion of the reactor vessel. A plurality of conduits extending from the underside of the lower core plate to the interior walls of the lower hemispherical portion of the reactor vessel carry the instrumentation lines through the lower plenum.

The presence of the conduits in the lower plenum assists in maintaining even coolant flow within the lower plenum and disrupting the formation of vortices in the circulating coolant fluid. Such vortices disrupt coolant flow and produce low pressure areas at the core coolant inlets which they intersect.

In newer reactors, it has become desirable for any instrumentation conduits to exit the reactor vessel other than through the lower plenum. It has been found that the absence of instrumentation conduits from the lower plenum permits vortices to form in the circulating coolant in the lower plenum.

U.S. Pat. No. 5,267,285 issued Nov. 30, 1993 and assigned to the assignee of this invention, suggested the use of one or more spaced parallel plates, supported in the lower plenum parallel to the lower support plate with holes for the passage of coolant, as a means to suppress vortices.

With the advent of larger passive plants with larger cores it became evident that further means were necessary to improve the distribution of coolant flow in the lower plenum to assure uniform coolant flow and pressure were maintained across all of the reactor core coolant inlet openings in the lower core support plate.

Accordingly, there is a further need to improve the design of the lower reactor vessel plenum to assure this uniform flow and pressure is maintained.

SUMMARY OF THE INVENTION

These and other objects are achieved by employing a cylindrical reactor pressure vessel having a lower head and a lower core support plate. A cylinder having a vertical wall with a plurality of holes extending therethrough and an upper edge is supported from a plurality of locations around the lower head with the upper edge of the cylinder proximate the lower core support plate so that the majority of coolant flow entering the reactor pressure vessel and down the annulus between the cylindrical reactor pressure vessel walls and the core barrel passes through the holes in the vertical wall of the cylinder on route to the core inlet holes in the lower core support plate which is supported by the lower end of the core barrel. Desirably, the upper edge of the cylinder is spaced below a bottom surface of the lower core support plate. Preferably a circumferential rib extends radially inward from the interior of the vertical wall of the cylinder to stiffen the wall so it can withstand the pressure of the flowing coolant.

In one embodiment the circumferential rib is formed slightly above a center of the height of the vertical wall of the cylinder and the holes in the vertical wall are formed in a first and second pattern. Preferably, the holes in the vertical wall of the cylinder are substantially the same size, and the first pattern of holes is above the rib and the second pattern of holes is below the rib. Desirably the first pattern is substantially, circumferentially continuous and the second pattern is not substantially, circumferentially continuous. In one embodiment a plurality of pairs of spaced vertical slots, extending from a bottom of the cylinder vertically upward, are cut in a lower portion of the vertical wall of the cylinder, with each pair of vertical slots forming an attachment leg that is connected to the lower head. Preferably the circumferential distance between some of the pairs of spaced vertical slots differ from the distance between others of the pairs of spaced vertical slots and desirably the slots are symmetric across a diameter of the cylinder. Preferably the connection locations of the attachment legs to the lower plenum are not vertically aligned with the attachment locations of the core barrel to the reactor pressure vessel. In one embodiment six to eight attachment legs are provided and the slots extend up vertically to just below the elevation of the rib. Desirably the non-continuous pattern of holes of the second pattern are separated by the attachment legs.

In another embodiment the holes in the first pattern and the holes in the second pattern are substantially aligned in circumferential rows and the number of rows of the second pattern are larger than the number of rows of the first pattern. Preferably, each row of the first pattern is nested in another row of the first pattern and each row of the second pattern is nested in another row of the second pattern.

Preferably, the cylinder substantially closes off the space between the annulus and a bottom portion of the lower head and the holes in the vertical wall of the cylinder are arranged so that a first portion of the coolant is directed directly up through the plurality of holes in the lower core support plate and a second portion of the coolant is directed downward toward the bottom portion of the lower head and up through the vortice suppression plates.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENTS

Figure 1:
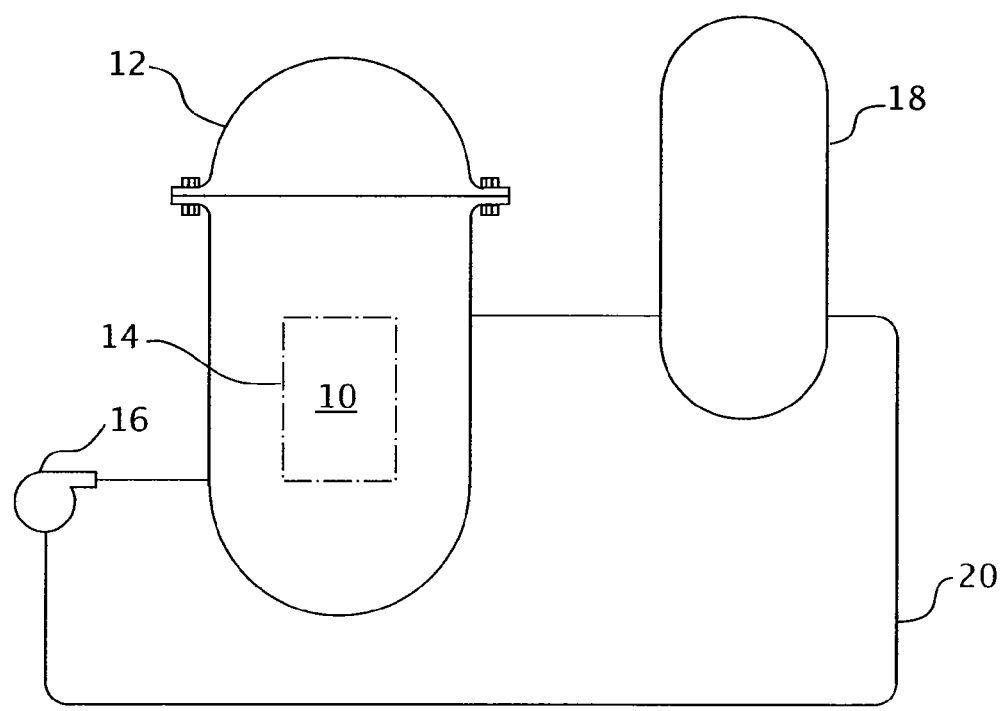
FIG. 1 is a simplified schematic of a nuclear reactor system to which this invention may be applied.

Referring now to the drawings, FIG. 1 shows a simplified nuclear reactor primary system, including a generally cylindrical reactor pressure vessel (10) having a closure head (12) enclosing a nuclear core (14). A liquid reactor coolant, such as water, is pumped into the vessel (10) by pump (16) through the core (14) where heat energy is absorbed and is discharged to a heat exchanger (18), typically referred to as a steam generator, in which heat is transferred to a utilization circuit (not shown), such as a steam driven turbine generator. The reactor coolant is then returned to the pump (16) completing the primary loop. Typically, a plurality of the above-described loops are connected to a single reactor vessel (10) by reactor coolant piping (20).

Figure 2:
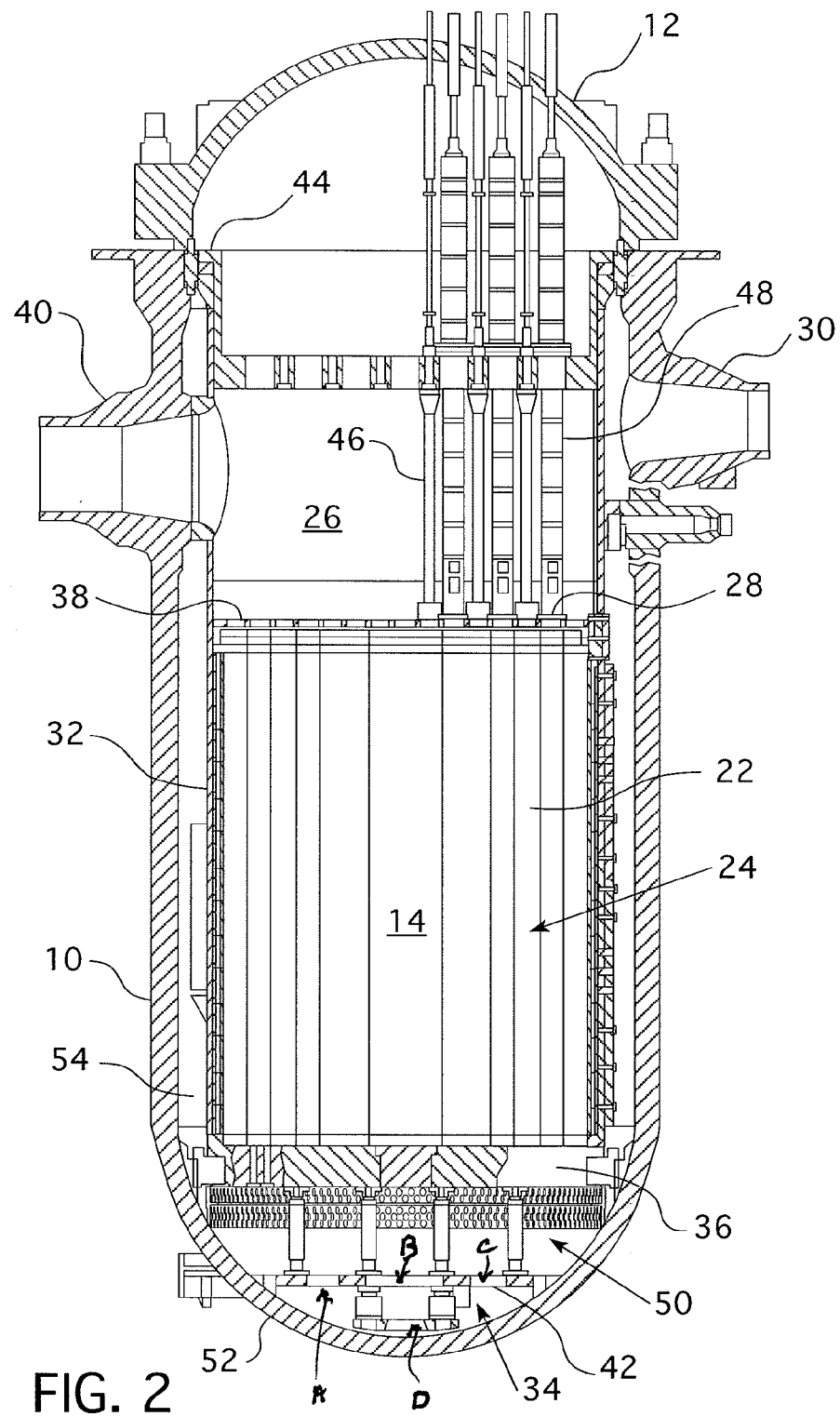
FIG. 2 is an elevational view, partially in section, of a nuclear reactor pressure vessel and internal components to which this invention may be applied.

An exemplary reactor design is shown in more detail in FIG. 2. In addition to a core (14) comprised of a plurality of parallel, vertical co-extending fuel assemblies (22), for purposes of this description, the other vessel internal structures can be divided into the lower internals (24) and the upper internals (26). In conventional designs, the lower internals function is to support, align and guide core components and instrumentation, as well as direct flow within the vessel. The upper internals restrain or provide a secondary restraint for the fuel assemblies (22), and support and guide instrumentation and components, such as control rods (28).

In the exemplary reactor shown in FIG. 2, coolant enters the vessel (10) through one or more inlet nozzles (30), flows downward through an annulus between the vessel (10) and the core barrel (32), is turned 180° in a lower plenum (34), passes upwardly through a lower core support plate (36) upon which the fuel assemblies (22) are seated, and through and about the assemblies. The coolant flow through the core and surrounding area is typically large, on the order of 400,000 gallons per minute at a velocity of approximately 20 feet per second. The resulting pressure drop and frictional forces tend to cause the fuel assemblies to rise, which movement is restrained by the upper internals (26), including a circular upper core plate (38). Coolant exiting the core (14) flows along the underside of the upper core plate (38) and upwardly through a plurality of perforations. The coolant then flows upwardly and radially to one or more outlet nozzles (40).

Rectilinearly moveable control rods (28) typically include a drive shaft and a spider assembly of neutron poison rods that are guided through the upper internals (26) and into aligned fuel assemblies (22) by control rod guide tubes (48). The guide tubes (48) are fixedly joined to the upper support assembly (44) and connected by a split pin force fit into the top of the upper core plate (38). The pin configuration provides for ease of guide tube assembly or replacement if ever necessary and assures that the core loads, particularly under seismic or other high loading accident conditions, are taken primarily by the support columns (46) and not the guide tubes (48). This assists in retarding guide tube deformation under accident conditions which could detrimentally affect control rod insertion capability.

In larger plants it is desirable to further refine the flow pattern in the lower plenum (34) to assure that a constant flow rate and pressure is maintained over the entire surface of the lower core support plate (36). To accomplish that objective this invention employs a flow skirt schematically shown in FIG. 2 by reference character (50) and shown in more detail in FIGS. 3-6. The flow skirt (50) is a perforated cylinder structure in the lower reactor vessel plenum (34) that channels the coolant exiting the annulus between the vessel (10) and the core barrel (32) through flow holes in the flow skirt (50) and is attached to the reactor vessel bottom head (52) by welding an integral attachment leg (66) to a land (56) on the reactor vessel bottom head (52) at circumferentially spaced locations around the bottom head. The mounting locations of the flow skirt (50) on the lands (56), circumferentially spaced around the bottom head (52) are diametrically symmetrical, though not evenly spaced, so that the mounting locations do not align vertically with the attachment positions of the core barrel to the interior of the reactor vessel wall.

Figure 3:
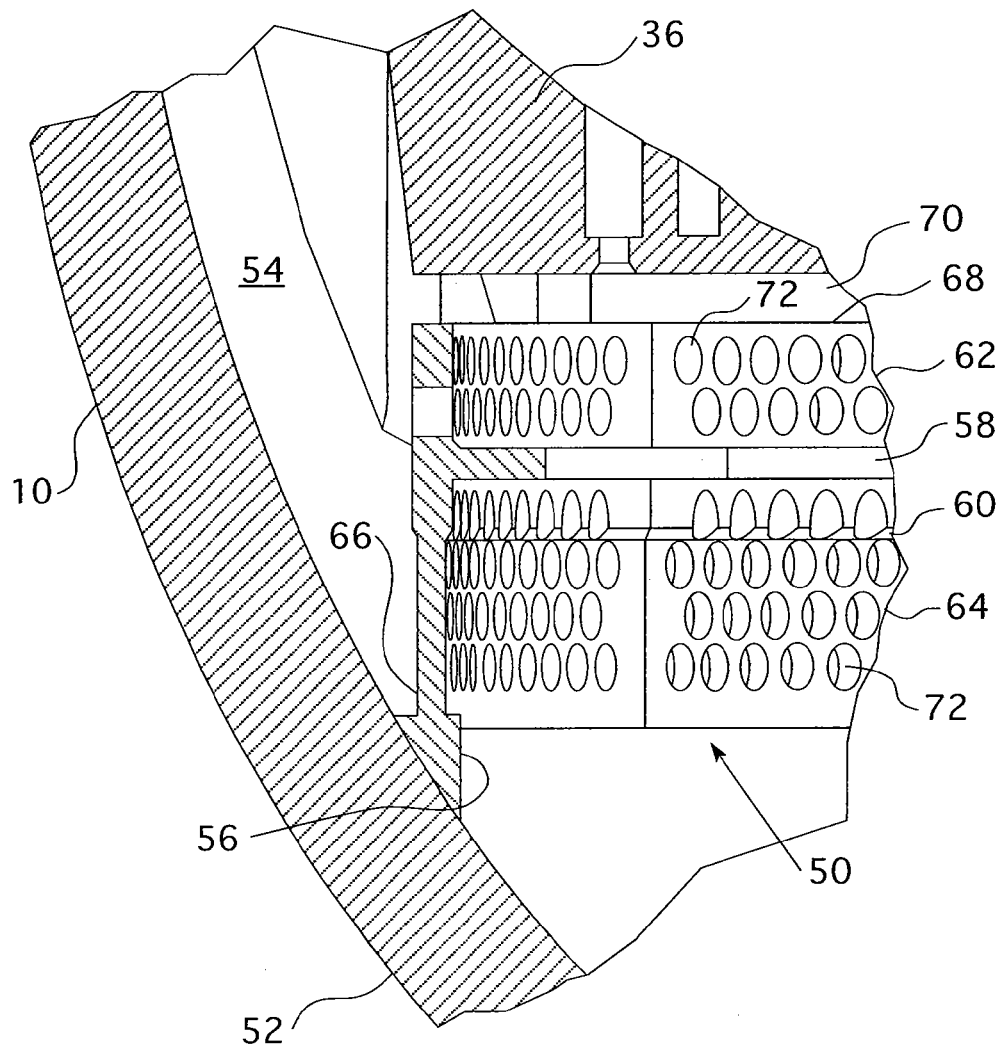
FIG. 3 is a partial cross-sectional view of the lower portion of the reactor pressure vessel shown in FIG. 2 with the flow skirt of this invention supported on the interior walls of the lower hemispherical portion of the reactor vessel.
Figure 4:
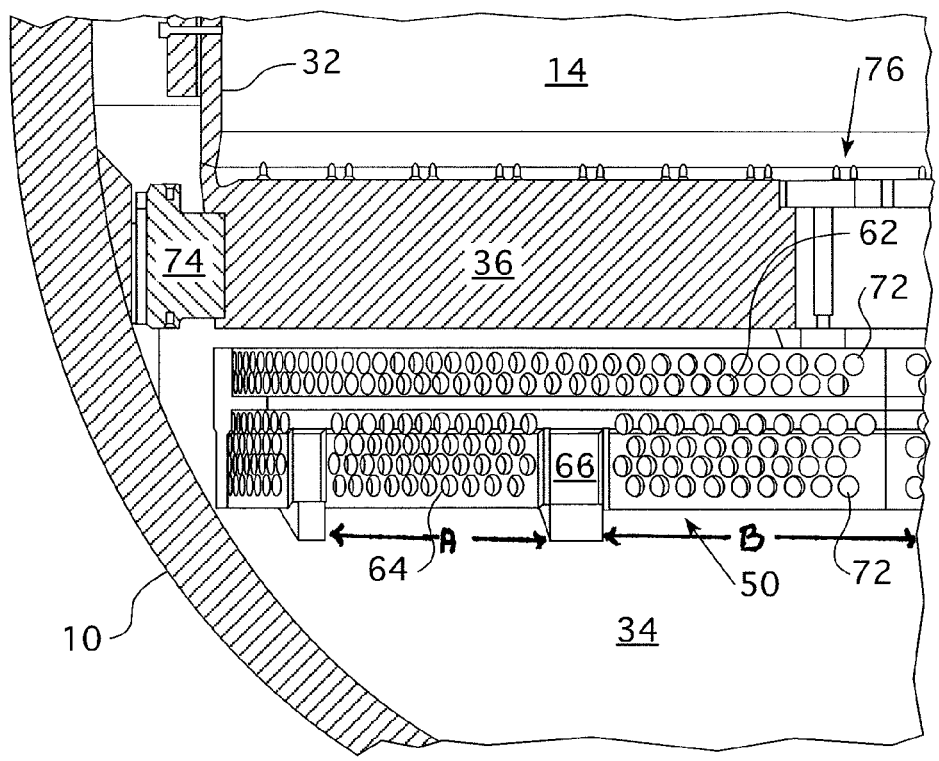
FIG. 4 is a side view partially in section which shows the flow skirt of this invention installed below the core support plate.
Figure 5:
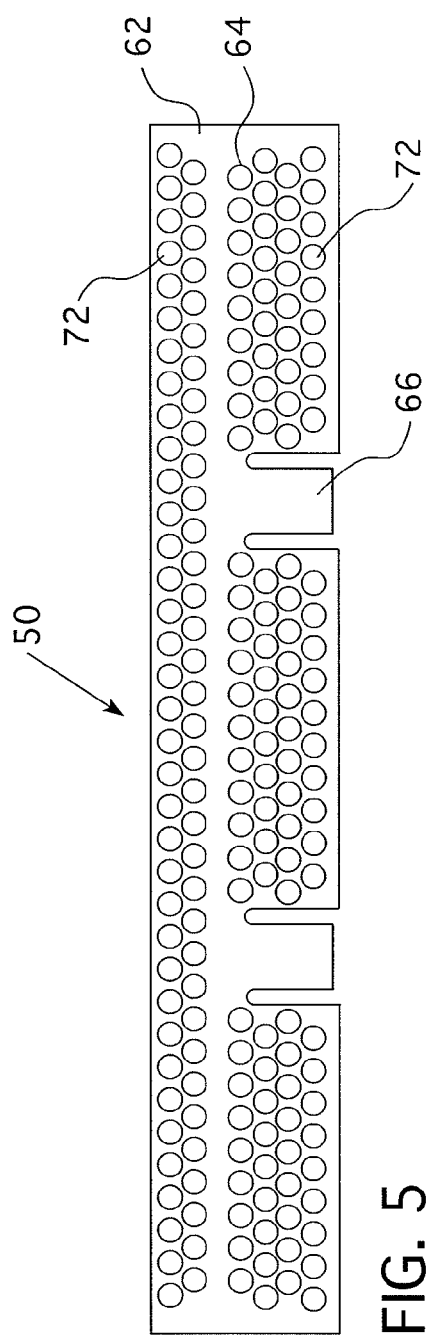
FIG. 5 is a flat patterned view of the hole pattern of the flow skirt of this invention.
Figure 6:
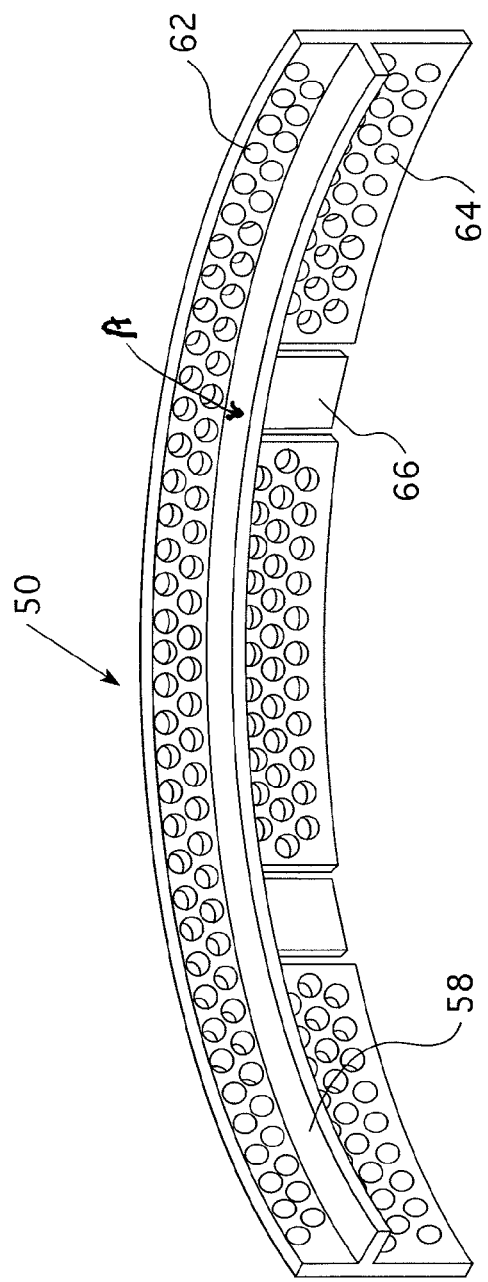
FIG. 6 is an isometric view of the interior portion of a section of the flow skirt of this invention.

FIG. 3 illustrates the connection of the flow skirt (50) to the lower vessel head (52) and the relative spacing of the flow skirt (50) with respect to the lower core support plate (36). A space (70) is maintained between a flow skirt (50) and the lower core support plate (36) to provide for relative movement of the core barrel, e.g., in the event of a seismic event, and differential thermal expansion, so the flow skirt is not damaged. The holes (72) in the flow skirt (50) are all approximately the same size and are arranged in two separate patterns. The first pattern (62) extends between an upper edge (68) of the flow skirt and a horizontal rib that forms a circumferential recess (58) in the outer surface of the flow skirt (50). The holes (72) in the first hole pattern (62) are formed in two circumferentially continuous rows that are nested together. The second hole pattern (64) is formed from four circumferentially discontinuous rows of holes (72) that are nested together on the surface of the vertical wall of the flow skirt (50) below the recess (58). The circumferential extent of the rows in the hole pattern (64) is interrupted by the attachment legs (66), which are shown in FIGS. 4, 5 and 6. A circumferential lip (60) extends around the flow skirt (60) and defines an increase in the thickness of the vertical wall of the flow skirt (50) below the lip (60) that strengthens the flow skirt and supports it against the forces of coolant flow.

FIG. 4 shows an elevational view of a quarter of the lower plenum (34) and provides a view of one of the radial keys that support the core barrel on the vessel (10) and its positioning relative to the support leg (66). The radial keys (74) are supported on the cardinal axis of the vessel (10) while the support legs are designed to be offset from the cardinal access. In all other respects, the flow skirt is shown in FIG. 4 as previously described with respect to FIG. 3. The lower core support plate (36) has an access port (76) whose cover can be removed to inspect the internals below the lower core support plate during plant outages. Typically, there are six to eight attachment legs (66) supporting the flow skirt (50) on the lower head (52).

FIG. 5 shows a flat pattern view of the outside surface of the vertical wall of the flow skirt (50). FIG. 5 provides a good view of the substantially circumferentially continuous pattern (62) having two rows of holes (72) nested together. FIG. 5 also provides a good view of the substantially circumferentially discontinuous hole pattern (64), which comprises four rows of the holes (72) nested together and circumferentially interrupted by the attachment legs (66).

FIG. 6 provides an isometric view of the portion of the interior of the flow skirt (50) showing the circumferential stiffening rib (58) which extends radially inward to strengthen the flow skirt (50). Like reference characters have been used among the several figures to identify corresponding components.

Referring back to FIGS. 2 and 3, the coolant enters through the inlet (30) into the vessel (10) and down the annulus (54). At the bottom of the annulus (54) the coolant encounters the flow skirt (50). A major portion of the coolant is then forced through the holes (72) in the flow skirt (50) wherein a portion is directed upward and directly through the lower core support plate (36) while a second portion is directed to the lower portion of the plenum (34) underneath the vortice suppression plate where this portion of the coolant turns upward through the holes in the vortice suppression plate to the lower core support plate. This hydraulic action balances the pressure and flow throughout the underside of the lower core support plate (36).

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention, which is to be given the full breadth of the appended claims and any and all equivalence thereof.

What is claimed is:

1. A reactor pressure vessel comprising:
a reactor pressure vessel cylindrical wall portion;
a lower head closing off a bottom of the cylindrical wall portion;
a core barrel substantially coaxially disposed within the cylindrical wall portion and defining a coolant downcomer annulus between the core barrel and the cylindrical wall portion;
a lower core support plate capping a bottom of the core barrel; and
a cylindrical flow skirt disposed below the lower core support plate in the lower head, the cylindrical flow skirt having a vertical wall with a plurality of holes extending therethrough and an upper edge, the cylindrical flow skirt being supported from spaced support locations around the lower head with a circumferential distance between at least some of the support locations being different than the circumferential distance between other of the support locations and the upper edge being proximate the lower core support plate so that a majority of coolant flow entering the reactor pressure vessel and traveling down the annulus passes through the holes in the vertical wall of the cylindrical flow skirt before passing through the lower core support plate.

2. The reactor pressure vessel of claim 1 wherein the upper edge of the cylindrical flow skirt is spaced from a bottom surface of the lower core support plate.

3. The reactor pressure vessel of claim 1 including a circumferential rib extending radially inward from the interior of the vertical wall of the cylindrical flow skirt to stiffen the wall.

4. The reactor pressure vessel of claim 3 wherein the rib is formed above the center of a height of the vertical wall of the cylindrical flow skirt.

5. The reactor pressure vessel of claim 3 wherein the holes in the vertical wall of the cylindrical flow skirt are formed in a first pattern and a second pattern.

6. The reactor pressure vessel of claim 5 wherein all of the holes in the vertical wall of the cylindrical flow skirt are substantially the same size.

7. The reactor pressure vessel of claim 5 wherein the first pattern is above the rib and the second pattern is below the rib.

8. The reactor pressure vessel of claim 7 wherein the first pattern is substantially circumferentially continuous and the second pattern is not substantially circumferentially continuous.

9. The reactor pressure vessel of claim 8 wherein a plurality of a pair of circumferentially spaced vertical slots extending from a bottom of the cylindrical flow skirt vertically upward, are cut in a lower portion of the vertical wall of the cylindrical flow skirt with each pair of vertical slots forming an attachment leg that is connected to the lower head at the support locations.

10. The reactor pressure vessel of claim 9 wherein a circumferential distance between some of the pairs of spaced vertical slots differs from the distance between others of the pairs of spaced vertical slots.

11. The reactor pressure vessel of claim 9 wherein the vertical slots extend from the bottom of the wall upward substantially to an elevation of the rib.

12. The reactor pressure vessel of claim 9 wherein there are 6 to 8 attachment legs.

13. The reactor pressure vessel of claim 9 wherein the attachment legs are substantially thinner than a circumferential distance between the legs.

14. The reactor pressure vessel of claim 9 wherein the core barrel is attached to an interior of the reactor pressure vessel spaced from a bottom of the lower head, at a plurality of circumferentially spaced locations wherein the attachment legs do not vertically align with the core barrel attachment locations.

15. The reactor pressure vessel of claim 8 wherein the non-continuous pattern of holes of the second pattern has the second pattern circumferentially separated by the attachment legs.

16. The reactor pressure vessel of claim 15 wherein the holes in the first pattern and the holes in the second pattern are substantially aligned in circumferential rows and the number of rows of the second pattern is larger than the number of rows of the first pattern.

17. The reactor pressure vessel of claim 16 wherein each row of the first pattern is nested in another row of the first pattern and each row of the second pattern is nested in another row of the second pattern.

18. The reactor pressure vessel of claim 3 wherein the rib forms a circumferential recess in an outer surface of the vertical wall of the cylindrical flow skirt.

19. The reactor pressure vessel of claim 1 including a circumferential lip on an outer surface of the vertical wall of the cylindrical flow skirt a distance below the upper edge, the lip defining an increase in a thickness of the vertical wall below the lip.

20. The reactor pressure vessel of claim 1 wherein the holes in the vertical wall of the cylindrical flow skirt are arranged so that a first portion of the coolant is directed directly up through a plurality of holes in the lower core support plate and a second portion of coolant is directed downward toward the bottom portion of the lower head.

21. The reactor pressure vessel of claim 20 including a horizontal vortex suppression plate having holes therethrough for the passage of coolant, wherein a substantial part of the second portion of coolant is directed through the vortex suppression plate from an underside upward to the lower core support plate.

22. A reactor having a pressure vessel comprising:
a lower head;
a lower core support plate; and
a cylindrical flow skirt disposed below the lower core support plate in the lower head, the cylindrical flow skirt having a vertical wall with a plurality of holes extending there thru and an upper edge, the cylindrical flow skirt being supported from spaced support locations around the lower head with a circumferential distance between at least some of the support locations being different than the circumferential distance between other of the support locations and the upper edge being proximate the lower core support plate so that a majority of coolant flow entering the reactor pressure vessel passes through the holes in the vertical wall of the cylindrical flow skirt before passing through the lower core support plate.

* * * * *